United States Patent [19]

Fladerer

[11] Patent Number: 4,500,992
[45] Date of Patent: Feb. 19, 1985

[54] SYNCHRONIZING ARRANGEMENT

[75] Inventor: Heinrich Fladerer, Planegg, Fed. Rep. of Germany

[73] Assignee: Siemens Aktiengesellschaft, Berlin & Munich, Fed. Rep. of Germany

[21] Appl. No.: 513,402

[22] Filed: Jul. 14, 1983

[30] Foreign Application Priority Data

Aug. 12, 1982 [DE] Fed. Rep. of Germany ....... 3230027

[51] Int. Cl.³ .............................................. H04J 3/06
[52] U.S. Cl. .................................................. 370/100
[58] Field of Search ...................... 370/100, 112, 108; 375/106

[56] References Cited

U.S. PATENT DOCUMENTS

| | | | |
|---|---|---|---|
| 3,593,044 | 7/1971 | McNeilly | 370/100 |
| 3,699,261 | 10/1972 | Tomozawa | 370/100 |
| 4,371,962 | 2/1983 | Zeitraeg | 370/100 |
| 4,404,680 | 9/1983 | Perkins | 370/100 |

OTHER PUBLICATIONS

CCITT "Yellow" Book, vol. 111, pp. 219–220 (Fascicle 111.3 Rec. G.992, Sec. 3.4).

Primary Examiner—Douglas W. Olms
Attorney, Agent, or Firm—Hill, Van Santen, Steadman & Simpson

[57] ABSTRACT

A time division multiplex signal of a high order with a frame code word which occurs block-wise is distributed between a plurality of channels in a demultiplexer and is supplied to the inputs of a synchronizing arrangement. The transmission path of the synchronizing arrangement comprises memories and a channel distributor. The channel distributor is controlled by the first memory by way of a decoder, further memories, and a coder in a single step. A logic linking arrangement and a frame counter permit resynchronization only when the frame code has failed to appear four times in succession. The synchronizing arrangement facilitates high-speed synchronization at bit rates of 140 Mbit/s and 565 Mbit/s, and also permits construction in accordance with emitter-coupled logic technology.

11 Claims, 7 Drawing Figures

4,500,992

SYNCHRONIZING ARRANGEMENT

CROSS REFERENCE TO RELATED APPLICATION

This application is related to an application Ser. No. 522,017, filed Aug. 11, 1983.

BACKGROUND OF THE INVENTION

1. Field of the Invention

The present invention relates to an arrangement for synchronizing outgoing channels at the outputs of a demultiplexer by way of a frame code word which occurs as a block in the incoming channel in a time division multiplex (TDM) system.

2. Description of the Prior Art

In synchronizing arrangements in TDM systems which operate with low bit rates, the synchronization takes place at the input of the demultiplexer. Speed-related difficulties occur for bit rates of 140 Mbit/s or 565 Mbit/s.

SUMMARY OF THE INVENTION

The object of the present invention is to provide a synchronizing arrangement which is capable of operating at a bit rate of 140 Mbit/s or 565 Mbit/s, which can be constructed as an integrated circuit (gate array) in accordance with emitter-coupled logic (ECL) technology, and which fulfills the CCITT recommendation in accordance with the Yellow Book Vol. 111, pp. 219–220 (Fascicle 111.3 Rec. G922, Section 3.4). In accordance with this recommendation, the channel assignment may be changed only when the frame code word has failed to be recognized four times in succession.

Beginning with an arrangement of the type generally set forth above, the above object is achieved, according to the present invention, in that the transmission path is provided with a first memory, a second memory, a channel distributor which is connected to the first memory and to the second memory, and a third memory. In the control path between the first memory and the channel distributor is a decoder, a fourth memory, a fifth memory and a coder, and following the fourth and fifth memories there is a logic linking arrangement followed by a frame counter which controls the fifth memory and the logic linking arrangement.

In the case of a synchronizing arrangement which serves to synchronize four outgoing channels to a 12-digit block frame code word, is advantageous that the invention should correspond to an embodiment as detailed hereinbelow.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
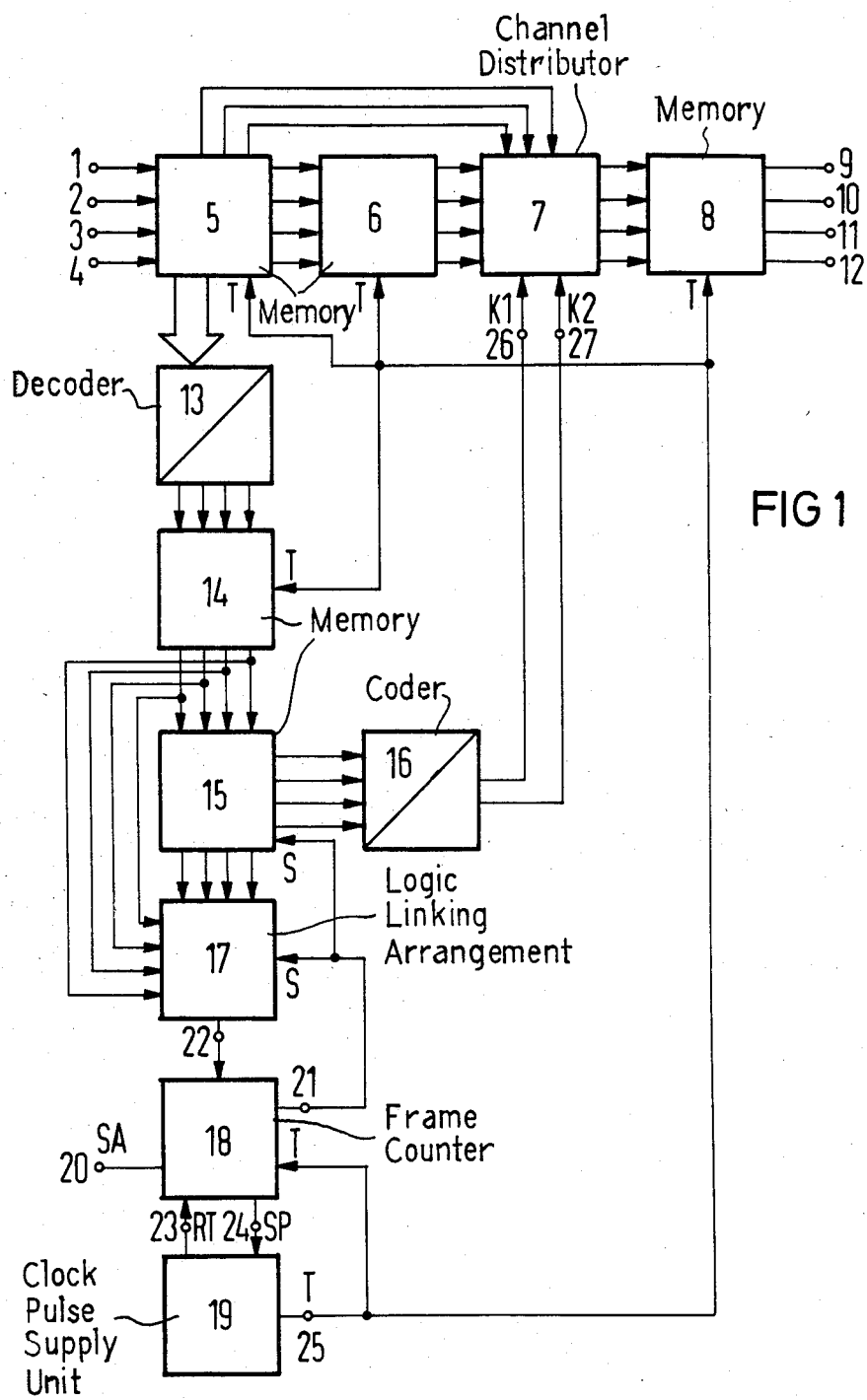
FIG. 1 is a block circuit diagram which illustrates a synchronizing arrangement constructed in accordance with the invention.

Referring to FIG. 1, a synchronizing arrangement constructed in accordance with the present invention is illustrated as comprising a plurality of memories 5, 6, 8, 14 and 15, a channel distributor 7, a decoder 13, a coder 16, a logic linking arrangement 17, a frame counter 18 and a clock pulse supply unit 19. The inputs 1–4 of the memory 5 are to be connected to the outputs of the demultiplexer of the system, and the outputs 9–12 are to be connected to the outgoing channels of the system. The reference T signifies the clock pulse train, the reference RT represents the frame clock pulse train, the reference S represents the control signal, the reference SP represents the setting pulse, the reference SA represents the synchronization display and the references K1 and K2 represent channel distributor signals.

The mode of operation of the synchronizing arrangement will be explained following the description of the detailed arrangements in FIGS. 2–4.

Figure 2:
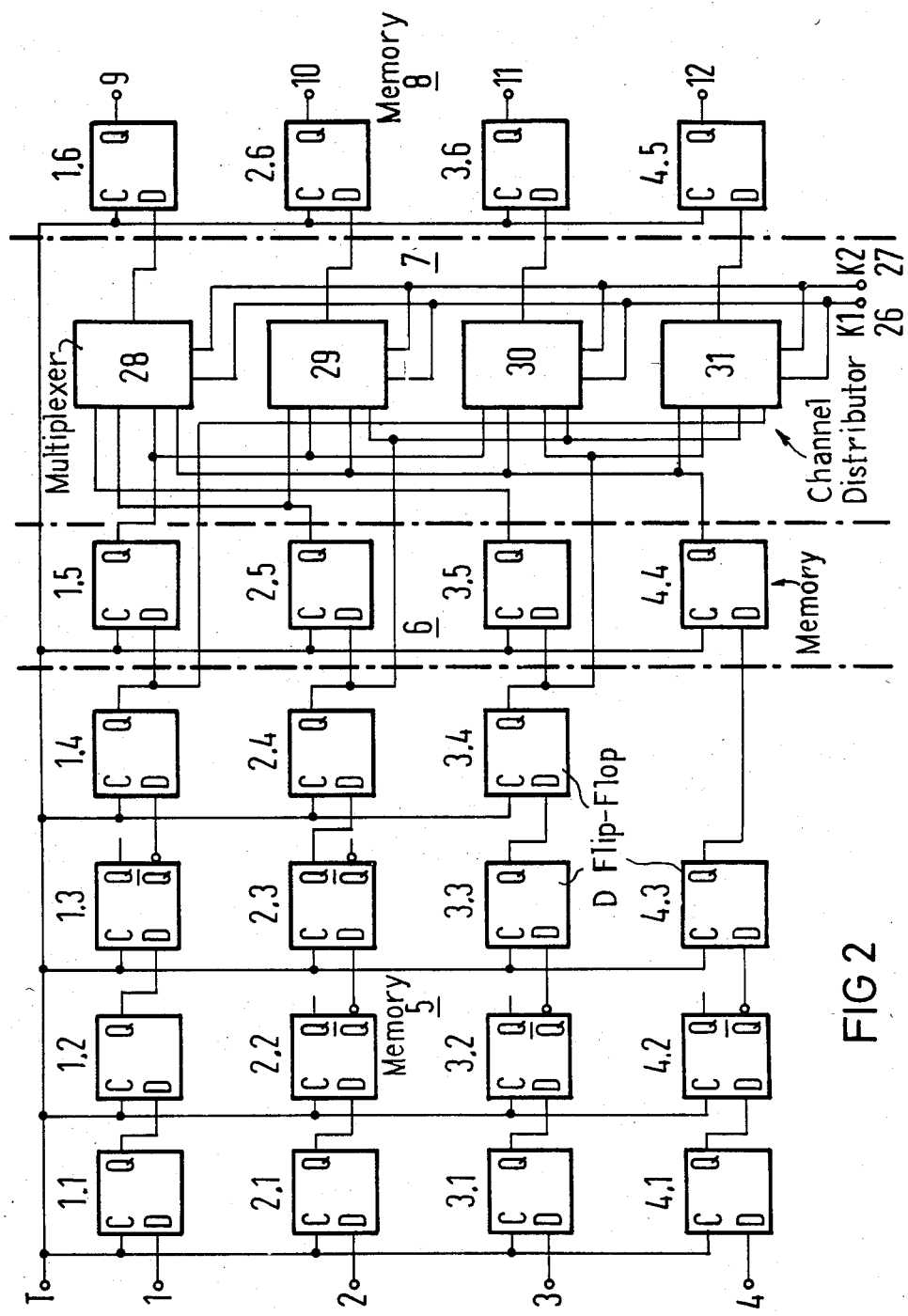
FIG. 2 is a detailed schematic illustration of those components of the arrangement located in the transmission path.

FIG. 2 represents the entire transmission path between the inputs 1–4 and the outputs 9–12, together with the memories 5 and 6, the channel distributor 7, and another memory 8. A plurality of D-flip-flops are designated by reference characters which comprise two figures linked by a decimal point. The first character designates the channel, whereas the second character designates the position of the D-flip-flop in the direction of transmission. A plurality of multiplexers are referenced 28–31.

Figure 3:
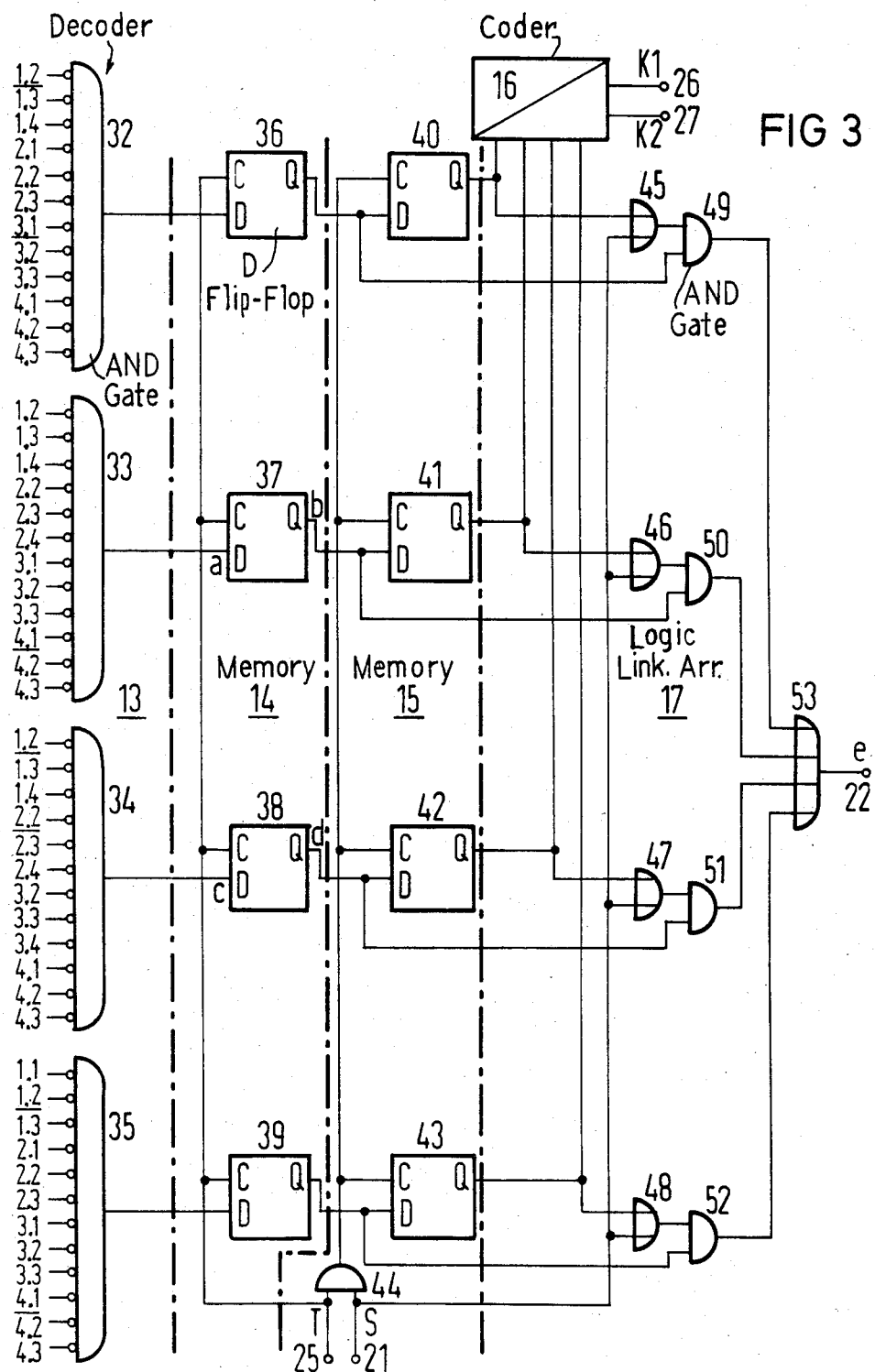
FIG. 3 is a schematic circuit diagram which shows, in detail, the control path, together with the decoder, the coder, the interposed memories and the logic linking arrangements.

FIG. 3 is a schematic representation of the decoder 13, the memories 14 and 15, the logic linking arrangement 17 and the coder 16.

The decoder 13 comprises four AND gates 32–35, the inputs of which are connected to the Q or $\overline{Q}$ outputs of D-flip-flops of FIG. 2 in accordance with the reference characters provided. A stroke above the D-flip-flop reference indicates output at the inverted output $\overline{Q}$. The memories 14 and 15 each comprise four D-flip-flops 36–39 and 40–43, respectively. The clock pulse inputs of the D-flip-flops and the memory 14 are connected to a clock pulse terminal 25, whereas the clock pulse inputs of the D-flip-flops in the memory 15 are connected to the output of an AND gate 44. One input of the AND gate 44 is connected to the clock pulse input 25, whereas the other input is connected to a control signal input 21.

The logic linking arrangement 17 comprises OR gates 45–48 and 53 and a plurality of AND gates 49–52.

Figure 4:
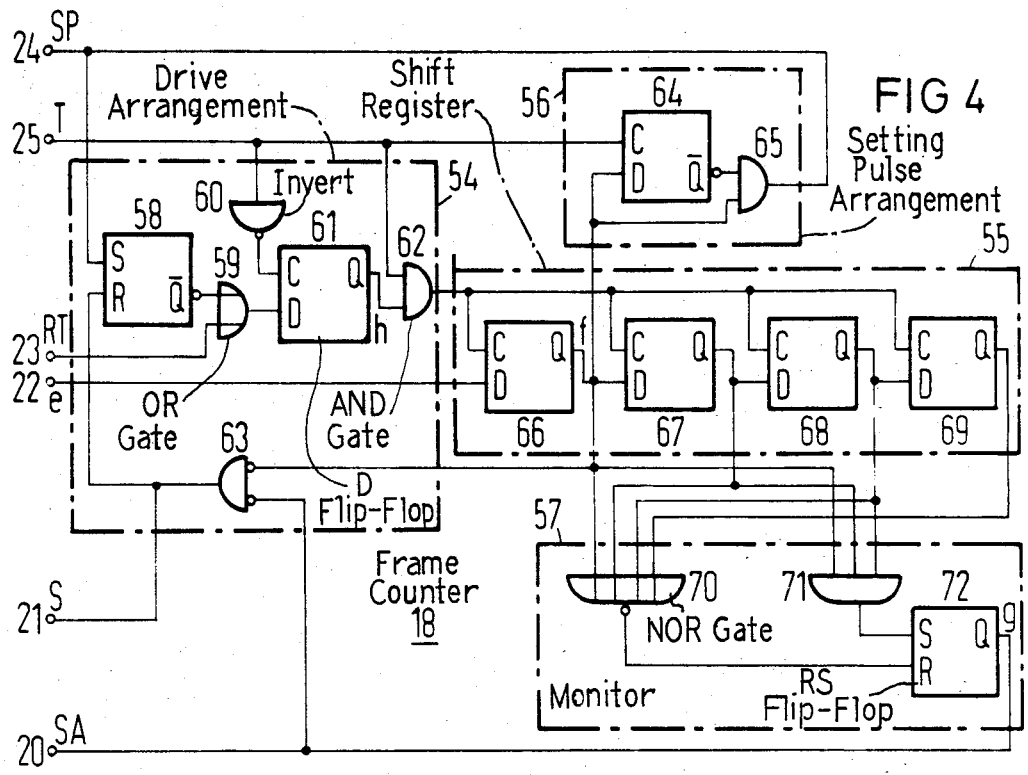
FIG. 4 is a schematic circuit diagram of a frame counter.

FIG. 4 illustrates a frame counter 18, having a drive arrangement 54, a setting pulse arrangement 56, a shift register 55 and a monitoring arrangement 57.

The drive arrangement 54 comprises a RS flip-flop 58, a D-flip-flop 61, an OR gate 59, an AND gate 62, an inverter 60 and an AND gate 63 which possesses inverting inputs. The setting pulse arrangement 56 comprises a D-flip-flop 64 and an AND gate 65. The shift register 55 comprises four D-flip-flops 66–69. The monitoring arrangement 57 comprises a NOR gate 70, an AND gate 71 and a RS flip-flop 72.

The mode of operation of the synchronizing arrangement of the present invention will be explained in the following, making reference to FIGS. 1-4 and to the pulse schedule illustrated in FIG. 7.

Four TDM signals which have been obtained by bit-wise distribution in a demultiplexer form a TDM signal of a higher order are applied to the inputs 1-4 of the synchronizing arrangement. The four TDM signals pass through the synchronizing device on the transmission path to the outputs 9-12. The decoder 13 establishes whether a frame code word of the TDM signal of a higher order 111110100000 occurs in the memory 5. The first frame code word recognized by the decoder 13 is stored in the memory 15, and in the coder 16 is converted into a code K1, K2 which controls the channel distributor 7. Therefore, the same channel assignment exists as in the case of the multiplexer at the transmitting end.

FIG. 2 illustrates in detail the transmission path of the synchronizing arrangement in accordance with the present invention. In the first channel, the memory 5 comprises four flip-flops 1.1-1.4, in the second channel four D-flip-flops 2.1-2.4, in the third channel four D-flip-flops 3.1-3.4, and in the fourth channel three D-flip-flops 4.1-4.3. In order to simplify the memory 5, a number of space saving D-flip-flops without an inverting output $\overline{Q}$ have been used. To enable a simple decoder 13 to be used, following the D-flip-flops 1.3, 2.2, 3.2 and 4.2 the items of data are forwarded in inverted form. Therefore, it is only these D-flip-flops and the D-flip-flop 2.3 for the decoding which require an inverting output $\overline{Q}$ in addition to the non-inverting output Q. The 12-digit frame code word can occur in four adjacent overlapping positions in the fifteen D-flip-flops of the memory 5. In the first position it is contained, for example, in the D-flip-flops 3.4, 2.4, 1.4, 4.3, 3.3, 2.3, 1.3, 4.2, 3.2, 2.2, 1.2 and 4.1 in the sequence of the frame code word; in the second position it is located between the D-flip-flops 2.4 and 3.1, in the third position between the D-flip-flops 1.4 and 2.1, and in the fourth position between the D-flip-flops 4.3 and 1.1.

The outputs of the D-flip-flops of the memory 5 are loaded by D-flip-flops which follow in the transmission path and by the connected AND gates 32-35 of the decoder 13. At a transmission speed of 140 Mbit/s or 565 Mbit/s, an excessive load leads to impermissible operating conditions which result in an operational breakdown. Therefore, prior to the channel distribution, the four TDM signals are advanced by one step, which can be effected by way of the second memory 6.

Now the channel distributor 7 is only connected to the D-flip-flops 1.4, 2.4, 3.4, 1.5, 2.5, 3.5 and 4.4 which are subject to a lighter load.

In the channel distributor 7, in accordance with the code word present at the control inputs 26 and 27, the four multiplexers 28-31 detect the synchronous member of the four positions which they switch through via the memory 8 to the outputs 9-12. Intermediate storage is necessary because of the high bit rate. The D-flip-flops 1.6, 2.6, 3.6 and 4.5 emit the data signals in inverted form because of the construction of the memory 5.

In the decoder 13 shown in FIG. 3, one of the AND gates 32-35 detects the frame code word and emits a signal to a following D-flip-flop in the memory 14. This signal is forwarded by way of the following D-flip-flop in the memory 15 to the coder 16 and to the logic linking arrangement 17 whenever a control signal S from the frame counter 18 is present at the input 21. This is the case when the arrangement is operating non-synchronously and the information "no frame code word recognized" is stored in the D-flip-flop 66 in the shift register 55.

In the non-synchronous state, the logic linking arrangement 17 switches through all the inputs of the memory 15 to its output 22. With the first frame code word which is recognized, the corresponding output signal of the memory 14 is stored in the following D-flip-flop of the memory 15 and is fed to the output 22 by way of which it reaches the frame counter 18. The control signal S now adopts the logic state "0" as a result of which the clock pulse supply of the memory 15 is disconnected and pulses can reach the output 22 only by way of the switched-through channel. The synchronous state is reached when three frame code words have been recognized. The situation changes only when the control signal S assumes the logic state "1" and switches through all of the OR gates 45-48.

The output pulses of the logic linking arrangement 17 which signify "frame code word recognized" are fed by way of the terminal 22 into the shift register 55 of the frame counter 18. This shift register 55 is pulsed by the output pulses of the drive arrangement 54.

The RS flip-flop 58 is reset by the setting pulse SP of the setting pulse arrangement 56. It is reset when the arrangement is non-synchronous and the D-flip-flop 66 has stored the information "no frame code word recognized", in which case the logic link takes place by way of the AND gate 63. The release signals for the clock train of the shift register 55, therefore either the output signal of the RS flip-flop 58 or the frame clock pulse train RT from the clock pulse supply 19 are logic linked with the OR gate 59 and forwarded to the D-flip-flop 61 which is pulsed by way of the inverter 60. By way of the AND gate 62, the output signal from this D-flip-flop 61 produces the clock pulse train T for the shift register 55.

Accordingly, the clock pulse train T is constantly connected to the shift register 5 when the arrangement is non-synchronous and the information "no frame code word recognized" is stored in the D-flip-flop 66. A clock pulse train T occurs in respect of each frame when the arrangement is synchronous or the D-flip-flop 66 has stored the information "frame code word recognized".

In the monitor arrangement 57 the RS flip-flop 72 stores the information as to whether the arrangement is synchronous or non-synchronous. It is synchronous when three frame code words have been correctly recognized in succession. This is the case when the AND gate 71 emits a signal. If four frame code words fail to be recognized in succession, and the NOR gate 70 emits a signal and resets the RS flip-flop 72, the arrangement is non-synchronous.

In the case of the first frame code word which is recognized, in the D-flip-flop 66 the signal changes from the logic state "0" to the logic state "1". One bit later the $\overline{Q}$ output of the D-flip-flop 64 in the setting pulse arrangement 56 changes from the logic state "1" into the logic state "0". As a result of the logic linking of these two signals with the AND gate 65, the setting pulse SP is available for the clock pulse supply unit 19 with a width of one bit.

Figure 5:
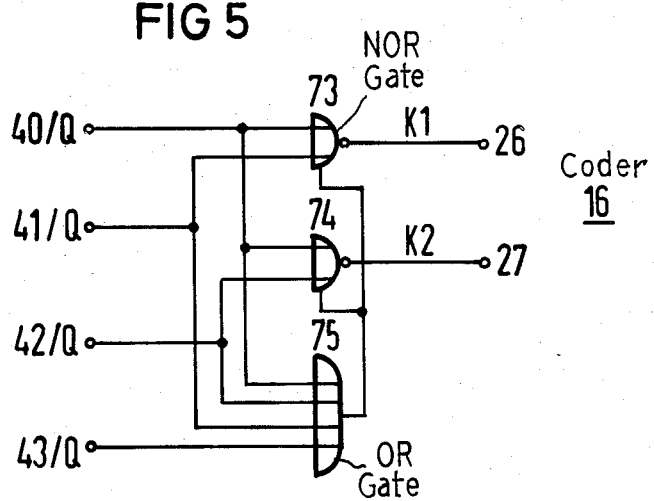
FIG. 5 is a schematic circuit diagram of a coder.

FIG. 5 represents the coder 16 which converts a decimal code as shown in the following table in a dual code.

| 40/Q | 41Q | 42Q | 43Q | K1 | K2 |
|------|-----|-----|-----|----|----|
| H | L | L | L | L | L |
| L | H | L | L | H | L |
| L | L | H | L | L | H |
| L | L | L | H | H | H |
| L | L | L | L | Z | Z |

The logic states H ≙ high-level and L ≙ low-level at the Q outputs of the D-flip-flops 40–43 are represented on the left-hand side, whereas those at the outputs 26 and 27 in FIG. 3 are represented on the right-hand side. Z signifies a highly-ohmic state.

The coder 16 comprises two NOR gates 73 and 74 which possess three-state outputs, and an OR gate 75.

Figure 6:
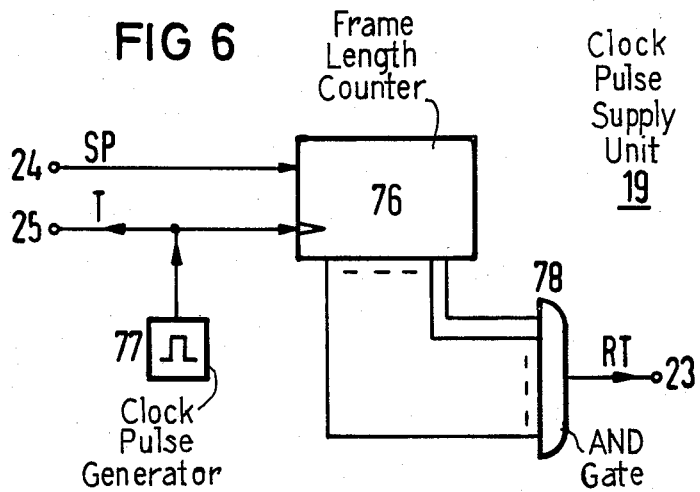
FIG. 6 is a schematic circuit diagram of a clock pulse supply unit.

FIG. 6 illustrates the clock supply unit 19, together with a frame length counter 76, a clock pulse generator 77 and an AND gate 78.

The frame length counter 76 counts the number of bits per channel which occurred in one frame. If a frame code word is discovered in the non-synchronous state, the setting pulse SK sets the frame length counter to a starting value. If a new frame code word is expected, the AND gate 78 emits a frame clock pulse RT which has a width of one bit.

Figure 7:
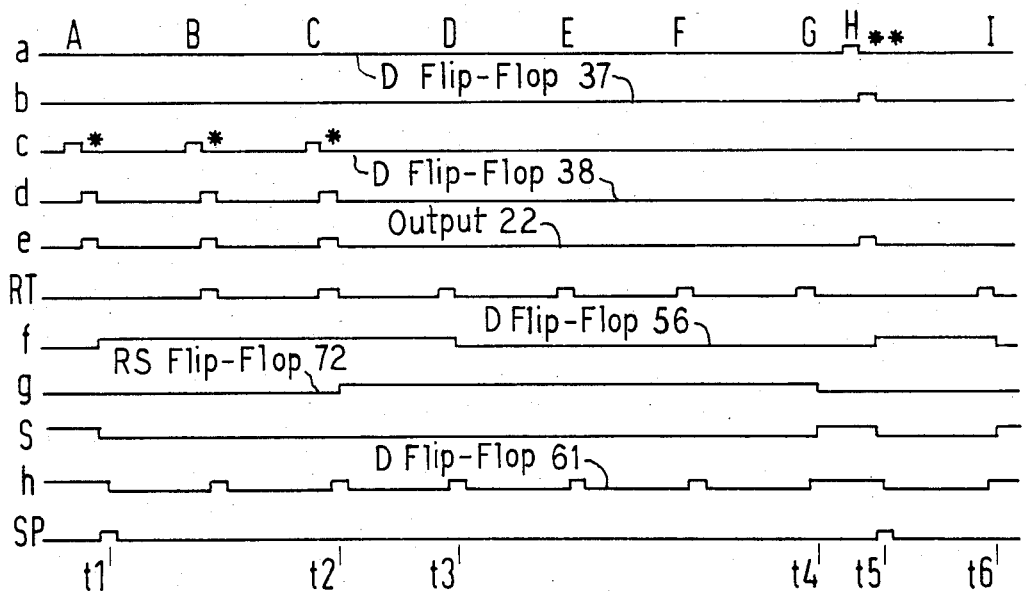
FIG. 7 is a pulse schedule for explanation of the mode of operation of the synchronizing arrangement.

The pulse schedule illustrated in FIG. 7 represents the following fundamental operations:

a represents the logic state at the input of the D-flip-flop 37;

b represents the logic state at the output of the D-flip-flop 37;

c represents the logic state at the input of the D-flip-flop 38;

d represents the logic state at the output of the D-flip-flop 38;

e represents the logic state at the output 22 of the OR gate 53 and thus of the logic linking arrangement 17;

f represents the logic state at the output of the D-flip-flop 66 in the shift register 55;

g represents the logic state at the output of the RS flip-flop 72 in the monitor 57; and h represents the logic state at the output of the D-flip-flop 61 in the drive arrangement 54.

Here the frame code words are identified as:

A is the first recognized frame code word;
B is the second recognized frame code word;
C is the third recognized frame code word;
D is the first non-recognized frame code word;
E is the second non-recognized frame code word;
F is the third non-recognized frame code word;
G is the fourth non-recognized frame code word;
H is the first frame code word which is again recognized;
I is the second frame code word which is now not recognized.

Hunting takes place during the interval to t1. During the interval between t1 and t2 synchronization is established, i.e. a frame code word is discovered three times in succession. Up until the time t2, the arrangement is non-synchronous. In the interval between t2 and t4 the arrangement is synchronous. In the interval between t3 and t4 synchronization is lost, i.e. no frame code word is discovered four times in succession. From the time t4 forward the arrangement is again non-synchronous. Hunting takes place during the interval from t4 to t5, synchronization is established during the interval from t5 to t6 and from the time t6 forward Hunting again takes place.

The character (*) indicates that the first bit of the frame code word lies in the third channel of the memory 5.

The character (**) signifies that the first bit of the frame code word is located in the second channel of the first memory. The frame length has been considerably shortened in the representation; for clarity and simplification the gate transit times have not been taken into account.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for synchronizing outgoing channels at the outputs of a demultiplexer by frame code words received as blocks in an incoming channel of a time-division multiplex system, comprising:

a transmission path including an input for receiving frame code words, an output for providing synchronized outgoing channels, a first memory connected to said input, a second memory connected to said first memory, a channel distributor connected to said second memory, and a third memory connected between said channel distributor and said output; and a control path comprising a decoder connected to said first memory for decoding frame code words, a fourth memory connected to said decoder, a fifth memory connected to said fourth memory and including a switch through output, a logic linking arrangement connected to said fourth and fifth memories, for recognizing frame code words, a frame counter connected to said logic linking arrangement for counting frames and connected to said logic linking arrangement and to said fifth memory to cause switch through of a corresponding channel predetermined in response to the recognition of a number of frame code words, and a coder connected to said switch through output and to said channel distributor for causing synchronous distribution of the output channels via said third memory.

2. The arrangement of claim 1, wherein four outgoing channels are synchronized with a twelve-digit frame code word, and wherein:

said first memory comprises first, second, third and fourth channels each including D-flip-flops Q and $\overline{Q}$ outputs, said first channel including first, second, third and fourth series-connected D flip-flops connected in the order Q-D, Q-D, $\overline{Q}$-D;

said second channel including first, second, third and fourth series-connected D flip-flops connected in the order Q-D, $\overline{Q}$-D, Q-D;

said third channel including first, second, third and fourth series-connected D flip-flops connected in the order Q-D, $\overline{Q}$-D, Q-D; and said fourth channel including first, second and third series-connected D flip-flops connected in the order Q-D, $\overline{Q}$-D.

3. The arrangement of claim 2, wherein:
each of said second and third memories comprises first, second, third and fourth channels and for each channel, a D flip-flop including a Q output and a clock input connected to the like clock inputs of the other D flip-flops of said second and third memories.

4. The arrangement of claim 3, wherein:
said channel distributor comprises first, second, third and fourth multiplexers each including an output, control inputs connected to said coder, and first, second, third and fourth inputs,
said first input of said first multiplexer connected to said Q output of said third channel of said D flip-flop of said second memory,
said second input of said first multiplexer connected to said Q output of said second channel D flip-flop of said second memory,
said third input of said first multiplexer connected to said Q output of said first channel D flip-flop of said second memory,
said fourth input of said first multiplexer connected to said Q output of said fourth channel D flip-flop of said second memory,
said first input of said second multiplexer connected to said Q output of said second channel D flip-flop of said second memory,
said second input of said second multiplexer connected to said Q output of said first channel D flip-flop of said second memory,
said third input of said second multiplexer connected to said Q output of said fourth channel D flip-flop of said second memory,
said fourth input of said second multiplexer connected to said Q output of said second channel fourth D flip-flop of said first memory,
said first input of said third multiplexer connected to said Q output of said first channel D flip-flop of said second memory,
said second input of said third multiplexer connected to said Q output of said fourth D flip-flop of said second memory,
said third input of said third multiplexer connected to said Q output of said third channel fourth D flip-flop of said first memory,
said fourth input of said third multiplexer connected to said Q output of said second channel fourth D flip-flop of said first memory,
said first input of said fourth multiplexer connected to said Q output of said fourth channel D flip-flop of said second memory,
said second input of said fourth multiplexer connected to said Q output of said third channel fourth D flip-flop of said first memory,
said third input of said fourth multiplexer connected to said Q output of said second channel fourth D flip-flop of said first memory, and
said fourth input of said fourth multiplexer connected to said Q output of said first channel fourth D flip-flop of said first memory.

5. The arrangement of claim 4, wherein:
said decoder comprises first, second, third and fourth AND gates each including an output connected to said fourth memory and each including a plurality of inverting inputs selectively connected to said outputs of said D flip-flops of said first memory, wherein said inputs of said first AND gate are connected to said outputs of said second, third and fourth D flip-flops of said first channel, to said outputs of said first, second and third D flip-flops of said second, third and fourth channels, said Q output being used for said third D flip-flop of said first channel and said second D flip-flop of said third channel and said Q outputs used for all other such connections to said first AND gate,
said inputs of said second AND gate are connected to said outputs of said second, third and fourth D flip-flops of said second and third channels, and to said outputs of said first, second and third D flip-flops in said third and fourth channels, where said Q output is used for the connection of said second D flip-flop in said fourth channel and said Q output is used for the remainder of such connections to said second AND gate,
said inputs of said third AND gate are connected to said outputs of said second, third and fourth D-flip-flops in said first, second and third channels, and to said outputs of said first, second and third D flip-flops in said fourth channel, where the Q output is used for the connection of said third D flip-flop in said first and second channels, and said Q output is used for the remainder of such connections to said inputs of said third AND gate, and
said inputs of said fourth AND gate are connected to said outputs of said first, second and third D flip-flops in said first, second, third and fourth channels, where said Q̄ output is used for said third D flip-flop of said first channel and for said second D flip-flop of said fourth channel and said Q output used for the remainder of said such connections of said inputs of said fourth AND gate.

6. The arrangement of claim 5, wherein:
said fourth memory comprises four channels each including a D flip-flop respectively connected to said outputs of said AND gates of said decoder, each of said D flip-flops comprising a Q output, and a clock input connected in common with the other D flip-flops of said fourth memory.

7. The arrangement of claim 6, wherein:
said fifth memory comprises four channels each including a respective D flip-flop connected to said Q output of a corresponding D flip-flop of said fourth memory, and a clock input connected in common with the other D flip-flops of said fifth memory; and
said fifth AND gate including an output connected to said clock inputs of said D flip-flops of said fifth memory, a first input connected to receive a clock pulse and a second input connected to receive a control pulse.

8. The arrangement of claim 7, wherein:
said logic linking arrangement comprises four channels each including an OR gate having an output, a first input connected to said Q output of a respective D flip-flop of said fifth memory and a second input connected to said second input of said fifth AND gate for receiving a control signal, and an AND gate including an output, a first input connected to said output of the respective OR gate and a second input connected to said Q output of the respective D flip-flop of said fourth memory, and a further OR gate including an output and four inputs connected to said outputs of said AND gates of said logic linking arrangement.

9. The arrangement of claim 8, wherein:
said frame counter comprises a shift register including an input connected to said output of said common OR gate of said logic linking arrangement,
a plurality of D flip-flops each including a Q output corresponding to the number of channels in said transmission path,
said arrangement further comprising a clock pulse supply unit,
said frame counter further including a drive arrangement connected to said clock pulse supply and connected to drive said shift register;
a setting pulse arrangement connected to said clock pulse supply unit and operated by said clock pulse supply arrangement and the first D flip-flop of said shift register, and
a monitoring arrangement connected to said Q outputs of said shift register and responsive thereto to emit the signal when three successive frame code words have been recognized.

10. The arrangement of claim 1, wherein:
said arrangement is constructed to operate at a bit rate of 140 Mbit/s in the incoming channel.

11. The arrangement of claim 1, wherein:
said arrangement is constructed to operate at a bit rate of 565 Mbit/s in the incoming channel.

* * * * *